US010013353B2

(12) United States Patent
Slavicek et al.

(10) Patent No.: US 10,013,353 B2
(45) Date of Patent: Jul. 3, 2018

(54) ADAPTIVE OPTIMIZATION OF SECOND LEVEL CACHE

(71) Applicant: Red Hat, Inc., Raleigh, NC (US)

(72) Inventors: Pavel Slavicek, Brno (CZ); Rostislav Svoboda, Rosice (CZ)

(73) Assignee: Red Hat, Inc., Raleigh, NC (US)

( * ) Notice: Subject to any disclaimer, the term of this patent is extended or adjusted under 35 U.S.C. 154(b) by 475 days.

(21) Appl. No.: 14/629,005

(22) Filed: Feb. 23, 2015

(65) Prior Publication Data

US 2016/0246718 A1  Aug. 25, 2016

(51) Int. Cl.
   G06F 12/08    (2016.01)
   G06F 12/0811  (2016.01)
   G06F 12/0813  (2016.01)

(52) U.S. Cl.
   CPC ...... *G06F 12/0811* (2013.01); *G06F 12/0813* (2013.01); *G06F 2212/283* (2013.01); *G06F 2212/314* (2013.01)

(58) Field of Classification Search
   CPC ............ G06F 12/0811; G06F 12/0813; G06F 2212/283; G06F 2212/314
   See application file for complete search history.

(56) References Cited

U.S. PATENT DOCUMENTS

| 7,617,218 | B2 | 11/2009 | Chatterjee et al. |
| 7,827,168 | B2 | 11/2010 | Bernard |
| 7,978,544 | B2 | 7/2011 | Bernard |
| 7,979,412 | B2 | 7/2011 | Johnson et al. |
| 8,356,288 | B2 | 1/2013 | Neufeld et al. |
| 8,458,402 | B1* | 6/2013 | Karnik ................ G06F 12/0804 711/118 |
| 2002/0091901 | A1* | 7/2002 | Romm .................. G06F 12/122 711/133 |
| 2007/0027838 | A1* | 2/2007 | Newport ........... G06F 17/30979 707/999.002 |

(Continued)

OTHER PUBLICATIONS

Debnath, "Using Second Level Caching in a JPA Application", Jan. 3, 2014, http://www.developer.com/java/using-second-level-caching-in-a-jpa-application.html (9 pages).

(Continued)

*Primary Examiner* — Aracelis Ruiz
(74) *Attorney, Agent, or Firm* — K&L Gates LLP

(57) ABSTRACT

Adaptive optimization of second level cache is disclosed. In an example embodiment, a system includes a database server and an enterprise application server, which includes an enterprise application execution module, a first level cache, a second level cache, and a cache optimizer. The enterprise application server iteratively executes an executable module, which causes receiving entity data from a database, with a plurality of different attributes, storing the entity data in a first level cache, and accessing an attribute in the entity data from the first level cache. The enterprise application server collects statistical data representing a quantity of accesses of attributes, determines an attribute to omit from a second level cache based on the statistical data, transfers a subset of the entity data from the first level cache, and stores, in the second level cache, the subset of the entity data with the at least one attribute omitted.

20 Claims, 5 Drawing Sheets

(56) References Cited

U.S. PATENT DOCUMENTS

| | | | |
|---|---|---|---|
| 2007/0094450 A1* | 4/2007 | VanderWiel | G06F 12/126 711/133 |
| 2013/0054897 A1* | 2/2013 | Flemming | G06F 12/0888 711/122 |
| 2014/0337276 A1 | 11/2014 | Iordanov | |

OTHER PUBLICATIONS

Rocher et al., The Grails Framework, version1.3.7, http://www.grails.org.doc/1.3.7/guide/single.html, accessed Jan. 16, 2015 (137 pages).

Java Persistence Performance: How to improve JPA performance by 1,825%, a blog on Java, performance, scalability, concurrency, object-relational mapping (ORM), Java Persistence API (JPA), persistence, databases, caching, Oracle, mySQL, NoSQL, XML, JSON, EclipseLink, TopLink, and other fun stuff http://java-persistence-performance.blogspot.in/2011/06/how-to-improve-jpa-performance-by-1825.html, accessed Jun. 9, 2015 (19 pages).

The Java EE 6 tutorial, Overview of the Second-Leval Cache, http://www.docs.oracle.com/javaee/6/tutorial/doc/gkjo.html, 2013 (3 pages).

Sangeetha et al., "JPA 2.0 Cache Vs. Hibernate Cache: Differences in Approach", Jul. 9, 2010, http://www.developer.com/java/ent/article.php/3892261/JPA-20-Cache-Vs-Hibernate-Cache-Differences-in-Approach.html (9 pages).

King et al., "Hibernate—Relational Persistence for Idiomatic Java", Hibernate Reference Documentation, 3.3.2.GA (342 pages).

\* cited by examiner

| Attribute | Entity Accesses | Attribute Accesses | Entity Access % | Total Access % |
|---|---|---|---|---|
| Customer ID # | 1240 | 840 | 67.7% | 8.2% |
| Customer Name | 1240 | 1136 | 91.6% | 11.1% |
| Customer Address | 1240 | 274 | 22.1% | 2.7% |
| Product SKU # | 3472 | 3460 | 99.7% | 33.9% |
| Product Price | 3472 | 3122 | 89.9% | 30.6% |
| Product Current Inventory | 3472 | 285 | 8.2% | 2.8% |

Fig. 4 ative optimization of second level cache. In an example embodiment, a system comprises a database
ADAPTIVE OPTIMIZATION OF SECOND LEVEL CACHE

BACKGROUND

Enterprise systems typically include a relational database and enterprise applications that require access to business data stored in the relational database. An enterprise system typically includes complex purpose-designed computer software used to satisfy the needs of an organization, as opposed to individual consumers. Modern enterprise systems typically store huge amounts of business data, which are accessed by the enterprise applications. The amount of business data transmitted to and from the relational database directly impacts an enterprise system's overall performance. An application programming interface (API) and/or middleware is used to interface between a relational database system and the enterprise applications. The API and/or middleware describes the management of relational data in enterprise applications. For example, Java Persistence API ("JPA") is a Java programming language application interface specification which describes the management of relational data in applications using Java Platform and Enterprise Edition.

SUMMARY

The present disclosure provides a new and innovative technique of adaptive optimization of second level cache. In an example embodiment, a system comprises a database server including a database and an enterprise application server. The enterprise application server includes an enterprise application execution module, a first level cache, a second level cache, and a cache optimizer. The enterprise application server iteratively executes an executable module, which causes receiving entity data from the database, the entity data including a plurality of different attributes, storing the entity data in the first level cache, and accessing at least one attribute in the entity data from the first level cache. The enterprise application server collects statistical data based on the executing executable module, the statistical data representing a quantity of accesses of each of the plurality of attributes. The enterprise application server determines at least one attribute, of the plurality of attributes, to omit from the second level cache based on the statistical data, transfers a subset of the entity data from the first level cache to the second level cache, with the subset having the at least one attribute omitted from the entity data, and stores, in the second level cache, the subset of the entity data with the at least one attribute omitted.

Additional features and advantages of the disclosed method and apparatus are described in, and will be apparent from, the following Detailed Description and the Figures.

BRIEF DESCRIPTION OF THE FIGURES

FIG. 4 is a data architecture illustrating statistical data, according to an example embodiment of the present disclosure.

DETAILED DESCRIPTION OF EXAMPLE EMBODIMENTS

Figure 1:
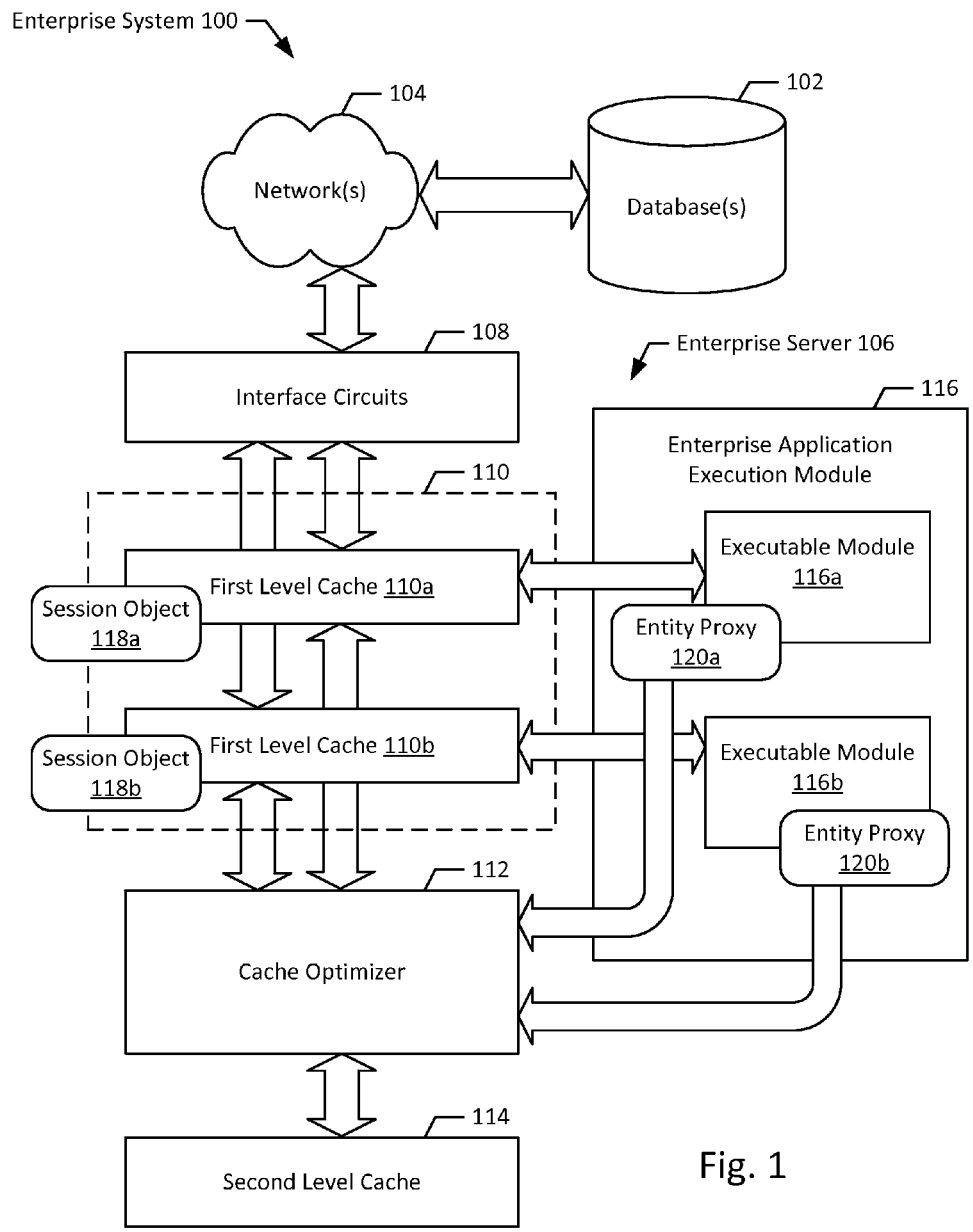
FIG. 1 is a block diagram of an example of an enterprise system, according to an example embodiment of the present disclosure.

FIG. 1 is a block diagram of an example of an enterprise system 100, according to an example embodiment of the present disclosure. The enterprise system 100 may include a database 102, a network 104, and an enterprise server 106. The enterprise server may include interface circuit 108, a first level cache 110, a cache optimizer 112, a second level cache 114, and an enterprise application execution module 116. The database 102 may be a database server which may include one or more relational databases. The network 104 may include one or more networks and/or communication paths (e.g., LAN, WAN, Internet, Wi-Fi, satellite, RS-232, etc.). The interface circuits 108 (e.g., Ethernet connection, wireless adapter, bus, router, etc.) provide connections between the network 104 and the enterprise server 106, between components within the enterprise server 106, and with outside components or user interfaces (e.g., display monitor, keyboard, touchscreen). The interface circuits 108 may include hardware and/or software configured to communicate via one or more communication interfaces using one or more communication protocols.

The first level cache 110 includes cache memory that provides very fast access to data stored within the first level cache 100. Typically, the first level cache 110 provides access to data that is orders of magnitude faster than the database 102 provides access to the data. However, the first level cache 110 has a limited capacity. The cache optimizer 112 is provided to adaptively optimize the data stored in the second level cache 114, which may receive data that is being flushed or removed from the first level cache 110, but may still be needed for processing by the enterprise application execution module 116 in the near future. The second level cache 114 provides fast access to data for the enterprise application execution module 116, not as fast as the first level cache 110, but still much faster than accessing the database 102. The second level cache 114 is typically larger than the first level cache 110, but still has relatively limited capacity in comparison to an external memory, such as database 102. When the enterprise application execution module 116 needs to access data, the enterprise application execution module 116 may first check the first level cache 110, and if the data is stored in the first level cache 110, proceed with very low latency processing of the data. If the data is not stored in the first level cache 110, the enterprise application execution module 116 may next check the second level cache 114, and if the data is stored in the second level cache 114, proceed with fairly low latency processing of the data. If the data is not stored in either cache 110 or 114, then the enterprise application execution module 116 checks an external memory such as the database 102, which has higher latency than accessing cached data.

In an example embodiment, the enterprise system 100 may be referred to as an enterprise application platform. In an example embodiment, the enterprise system 100 is a Java based enterprise system using Java Persistence API ("JPA"), which is is a Java programming language application interface specification which describes the management of relational data in applications using Java Platform and Enterprise Edition. Caching of data is a facility provided by JPA implementation which helps improve application performance. Generally, caching reduces number of queries made to a database in a single transaction or execution of an executable module. Thus, JPA provides for caching of data to reduce the amount of business data transmitted to and from the relational database, which improves performance of enterprise systems. A variety of JPA implementations exist, such as Hibernate provided by Red Hat, Inc., which implements caching at a class level using a first level cache and a second level cache. In an example embodiment, the enterprise system 100 uses Hibernate by Red Hat, Inc. to implement adaptive optimization of the second level cache 114.

In an example embodiment, the first level cache 110 is enabled by default. The first level cache 110 may be dynamically allocated into blocks 110a, 110b which are each exclusively associated with respective executable modules 116a, 116b (e.g., deployed application business logic) while the executable modules 116a, 116b execute. The executable modules 116a, 116b may be executed on one or more physical processors, and may be provided as applications, virtual machines, software modules, or the like. It should be appreciated that, although only two executable modules 116a, 116b are illustrated, many executable modules (not shown) may be concurrently executing. Likewise, the first level cache 110 may include many blocks that are dynamically allocated to any executing executable modules. The executable modules 116a, 116b may be accessing data from database 102 to respond to a client request, run a report, generate messages, and/or perform any business logic that an enterprise requires for running its business.

When an executable module 116a begins executing, a session object 118a is created. The session object 118a is associated with and is only accessible to one specific executable module 116a (e.g., one transaction), and thus, the session object 118a and the block 110a is inaccessible to each other executable module 116b. A session object 118a, 118b is used for accessing entity data (e.g., create, read, update, delete) from a database 102. An entity (e.g., customer, product, department, employee) may be represented by entity data which may be provided as a row of data from a database 102, for example, via a lazy loading implementation. Once an executable module 116a completes execution of a session associated with session object 118a, the session closes, and the data stored in the first level cache 110 in block 110a will be lost once the session is closed. The data stored in the block 110a cannot be accessed by any other session object 118b or any other executable module 116b. When the session is closing, the data stored in block 110a of the first level cache 110 may be transferred to the second level cache 114.

In an example embodiment, the second level cache 114 is an optional cache, and first level cache 110 may always be consulted before any attempt is made to locate data in the second level cache 114. Unlike the first level cache 110, the second level cache 114 may provide for access to cached data across sessions. The second level cache 114 may reduce number of queries made into the database 102, thus improving the overall operating speed of the enterprise system 100. The cache optimizer 112 adaptively optimizes which data from the first level cache 110 is transferred to and stored in the second level cache 114. The cache optimizer 112 received statistical data from an entity proxy 120a, 120b which is associated with each executable module 116a, 116b, respectively. For example, an entity proxy 120a may monitor "get" operations and indicate which attributes in the entity data were accessed by the executable module 116a. The cache optimizer 112 may continuously compile statistical data which is received from entity proxies 120a, 120b and adaptively optimize which data is stored in the second level cache 114. The cache optimizer 112 advantageously allows for keeping data longer in the second level cache 112, which leads to better enterprise system 100 performance due to temporal locality and/or spatial locality of entity data which is used by the enterprise application execution module 116.

Figure 2:
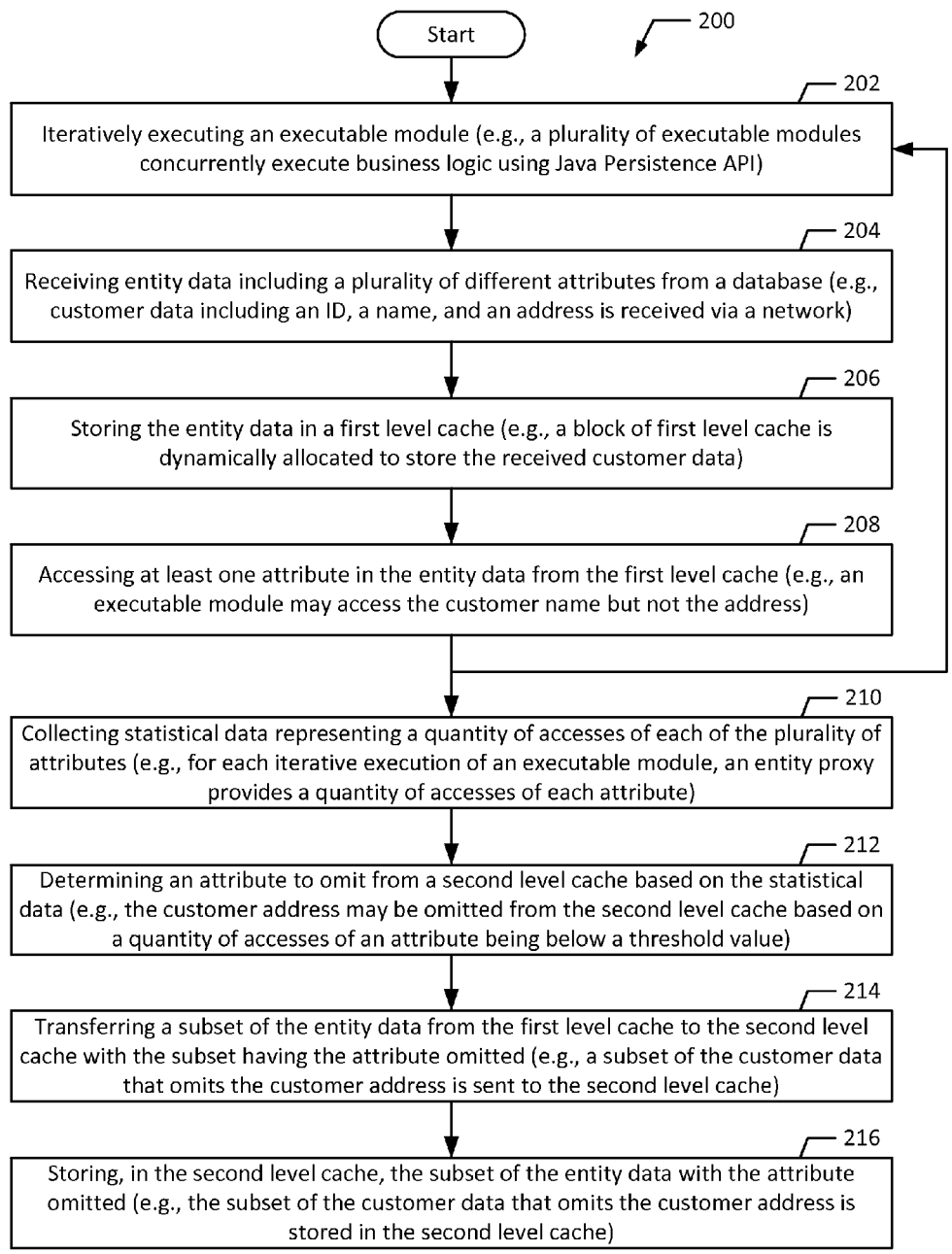
FIG. 2 is a flowchart illustrating an example process for adaptive optimization of second level cache, according to an example embodiment of the present disclosure.

FIG. 2 is a flowchart illustrating an example process for machine learning in a heterogeneous group of edge devices, according to an example embodiment of the present disclosure. Although the process 200 is described with reference to the flowchart illustrated in FIG. 2, it will be appreciated that many other methods of performing the acts associated with the process 200 may be used. For example, the order of some of the blocks may be changed, certain blocks may be combined with other blocks, and some of the blocks described are optional.

The example process 200 may begin with iteratively executing an executable module (block 202). For example, a plurality of executable modules may concurrently execute business logic using Java Persistence API. In an example embodiment, once an executable module 116a completes execution of a transaction, the executable module 116a may perform a new execution of another transaction. Also, the executable module 116a may only be occasionally executed, on an as needed basis.

Iteratively executing executable modules may include a variety of processes which may be changed based on prior executions by the enterprise application execution module 116 (e.g., depending on whether requested entity data is stored in cache or not stored in cache). For example, the example process 200 may include receiving entity data including a plurality of different attributes from a database (block 204). For example, requested entity data may include customer data including a customer ID, a customer name, and a customer address, which is received via a network, for example, from the database 102. Next, the entity data may be stored in a first level cache (block 206). For example, a block 110a of first level cache 110 is dynamically allocated to store the received customer data, including the customer ID, the customer name, and the customer address.

The example process 200 may continue with accessing at least one attribute in the entity data from the first level cache 110 (block 208). For example, an executable module 116a may access the customer name from block 110a of first level cache 110, but not the customer address. Typically, the entity data may include many attributes, many of which may be accessed in a single execution or session. For example, some attributes may be read most of the time and/or updated most a high percentage of the time, and other attributes may only be accessed occasionally. In an example embodiment, the interface circuits 108 include dedicated connections to and from the first level cache 110, which allows the enterprise application execution module 116 to access data from the blocks 110a, 110b of first level cache 110 very quickly. For example, the block 110a includes dedicated connections to the interface circuits 108 and to the cache optimizer 112, and likewise, block 110b includes dedicated connections to the interface circuits 108 and to the cache optimizer 112. Also, if the first level cache 110 does not include entity data which the enterprise application execution module 116 needs to access, the second level cache 114 may be checked for the entity data prior to making a request for access to the database 102, and the interface circuits 108 may likewise include dedicated connections to and from the second level cache 114 to move the entity data back into first level cache 110 and/or the enterprise application execution module 116. As illustrated in FIG. 2, the iterative execution of executable modules may occur in a continuous or semi-continuous loop fashion, where executable modules 116a, 116b execute until completion, and then enterprise application execution module 116 continues executing the same or different executable modules concurrently and/or iteratively.

The example process 200 includes collecting statistical data representing a quantity of accesses of each of the plurality of attributes (block 210). For example, for each iterative execution of an executable module 116a, an entity proxy 120a provides a quantity of accesses of each attribute. Accordingly, the cache optimizer 112 may collect statistical data from entity proxies 120a, 120b, for example, including a quantity of entity accesses (e.g., customer accesses) and a quantity of attribute accesses (e.g., customer ID accesses, customer name accesses, customer address accesses). The quantity of accesses may be represented as a percentage based on a first quantity of accesses of an attribute to a second quantity of total accesses of all entity data. The attribute accesses may be organized based on different entity types, which may typically have different attributes. The statistical data may include various totals, percentages, ratios, or the like, which may be used to determine which portions of entity data are more or less likely to be accessed by the enterprise application execution module 116.

The example process 200 includes determining an attribute to omit from a second level cache based on the statistical data (block 212). For example, the cache optimizer may determine that the customer address should be omitted from the second level cache 114 based on a quantity of accesses of an attribute being below a threshold value. The threshold level may be a configurable value, which may be set and/or modified by a user of the enterprise system 100. In an example embodiment, the threshold level has a default value of 5%, which may be adjusted based on collected statistical data and/or system performance. In an example embodiment, it may be determined that multiple attributes should be omitted from the second level cache 114. In another example embodiment, it may be determined that no attributes should be omitted from some particular entity data, for example, if each attribute for an entity is accessed relatively frequently. The cache optimizer may run on a dedicated or shared physical processor, and may be implemented as a software module, virtual machine, or the like. As discussed below in greater detail, a variety of statistical information may be used for determining whether to omit an attribute from second level cache 114.

The example process 200 continues with transferring a subset of the entity data from the first level cache 110 to the second level cache 114 with the subset having the attribute omitted (block 214). For example, a subset of the customer data that omits the customer address is sent to the second level cache 114. The example process 200 continues with storing, in the second level cache 114, the subset of the entity data with the attribute omitted (block 216). For example, the subset of the customer data that omits the customer address is stored in the second level cache 114. Storing a subset of the entity data with an omitted attribute in the second level cache 114 reduces the amount of data stored in the second level cache 114, with respect to that particular entity (e.g., a customer), which advantageously results in entity data for a greater number of entities to be stored in the second level cache, and thus, a reduction in the number of accesses to the database 102 by the enterprise application execution module 116.

Figure 3:
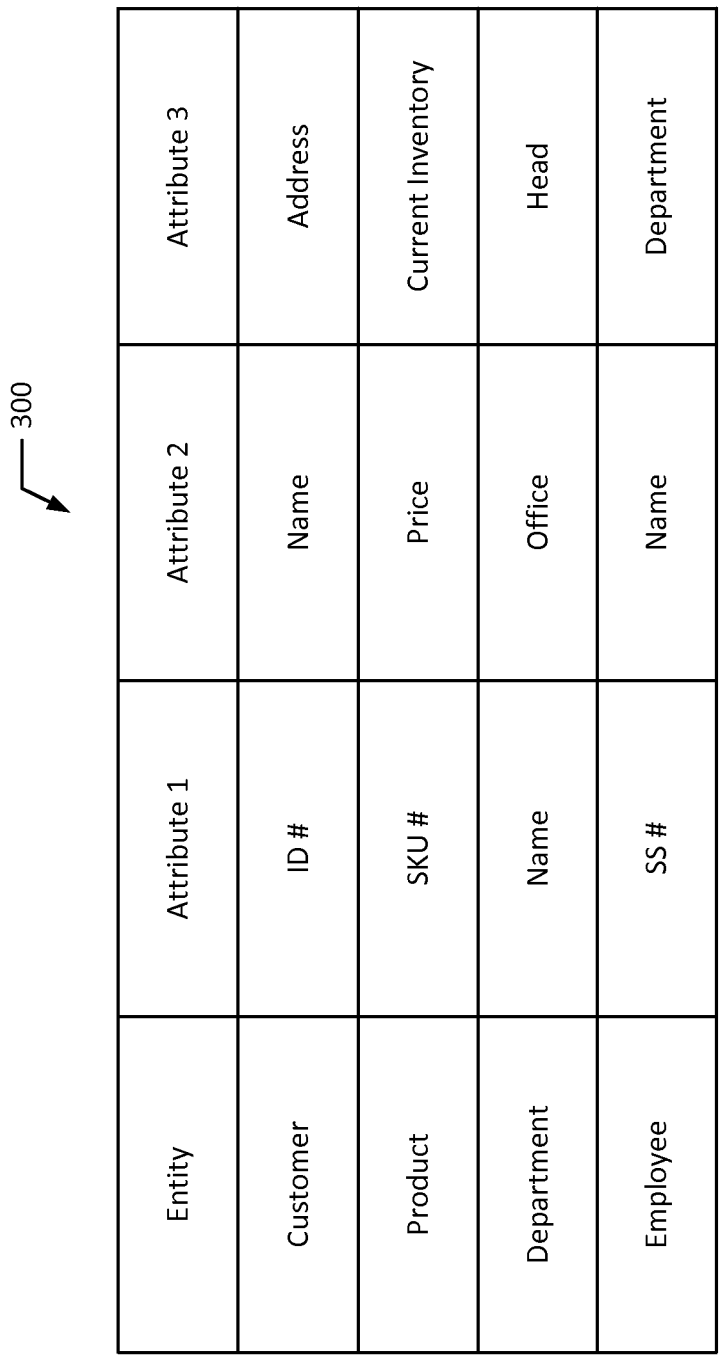
FIG. 3 is a data architecture illustrating entity data, according to an example embodiment of the present disclosure.

FIG. 3 is a data architecture illustrating entity data 300, according to an example embodiment of the present disclosure. As shown in FIG. 3, each entity has several attributes associated with the entity, and the attributes are provided in rows. For example, for a customer entity, a database 102 may store a customer ID number, a customer name, a customer address, and any other attributes of customers which is required for execution of any business logic in the enterprise system 100. It should be appreciated that the example entity data 300 typically would include many attributes for many types of entities. As illustrated in FIG. 3, a product entity has attributes including a SKU number for the product, a price for the product, and a current inventory of the product. A department entity may have attributes including a department name, an office that the department is headquartered in, and a name of an employee acting as the department head. An employee entity may have attributes including a social security number, a name, and a department that the employee works in. Typically, each entity type may have a table with rows of instances of the entity. For example, a customer table may have several hundred customers, each having an ID number (e.g., 1234567), a name (e.g., John Doe), an address (e.g., 123 Main St.), etc. Each time a row of the customer table must be accessed by the enterprise application execution module 116, if the entity data for that row is not cached, the entity data for that row must be accessed from the database 102. As discussed above, statistical data representing a quantity of accesses of the attributes of the entity data is collected as execution of executable modules 116a, 116b occurs.

FIG. 4 is a data architecture illustrating statistical data 400, according to an example embodiment of the present disclosure. As shown in FIG. 4, statistical data for attributes of the customer entity and the product entity are illustrated for purposes of example, however, statistical data for other entity types (e.g., department, employee) may also be collected for a system as described with reference to FIG. 3. As shown in FIG. 4, a customer entity was accessed 1,240 times and a product entity was accessed 3,472 times. Of the 1,240 customer entity accesses, the attributes were accessed in differing quantities. For example, the customer ID number was accessed 840 times, the customer name accessed 1,136 times, and the customer address accessed 274 times during a period in which the statistical data was being collected. The percentage of entity accesses is shown as 67.7%, 91.6%, and 22.1%, respectively, and the percentage of total accesses is shown as 8.2%, 11.1%, and 2.7%, respectively. The percentage of total accesses is based on 10,220 total entity accesses for all entities, for example, including department, employee, etc., in addition to the customer and product entity accesses. Thus, for example, if a threshold value of 5% of total accesses is used to determine whether to omit customer attributes, the customer address (2.7%) will be omitted from the second level cache 114. Regarding the product entity, 3,472 total accesses occurred. The product SKU number was accessed 3,460 times, the product price was accessed 3,122 times, and the product current inventory was accessed 285 times during the period in which the statistical data was being collected. The percentage of entity accesses is shown as 99.7.7%, 89.9%, and 8.2%, respectively, and the percentage of total accesses is shown as 33.9%, 30.6%, and 2.8%, respectively. Thus, for example, if a threshold value of 5% is used to determine whether to omit customer attributes, the product current inventory (2.8%)

will be omitted from the second level cache 114. Accordingly, the second level cache 114 may omit the customer address for each customer entity and also omit the product current inventory for each product entity, thereby advantageously reducing the footprint of these entities in the second level cache 114. Thus, in an example embodiment, an enterprise system 100 (e.g., a JPA implementation) adaptively optimizes second level cache at the attribute level, resulting in improved performance.

As illustrated in FIG. 4, the relative number of accesses of each attribute is dependent on how often an entity is accessed, and when the entity is accessed, how often the attribute is accessed. Thus, it should be noted that even though the entity access percentage for customer address is greater than the entity access percentage for product current inventory, the total access percentage is greater for the product current inventory because the product entity is accessed more often than the customer entity (e.g., 3,472>1, 240). Thus, a percentage of total entity accesses may typically be a suitable threshold value. In an example embodiment, the quantity of accesses as a percentage of all entity accesses is compared to a threshold percentage, such as 5%. However, other threshold values may be used and/or other statistical data may be used for making a determination of whether to omit attributes or not. For example, in an example embodiment, a particular entity type may be known to have particularly high temporal locality, and thus, attributes for that entity type may only be omitted only if an entity access percentage is below a threshold, regardless of whether the total access percentage is below the threshold. Thus, different entity types may have different threshold values. The threshold value may be based on a percentage of accesses or any other statistical measure which may indicate a likelihood of another access by the enterprise application execution module 116 that justifies, either, storing the entity data in the second level cache 114 or omitting the entity data from the second level cache 114.

Also, any attribute that is a unique key for an entity may be immune to being omitted from the second level cache. Accordingly, for example, if the threshold value was configured as 10% of the total accesses of all entities, the customer ID number (8.2%), as shown in FIG. 4, would fall below the 10% threshold. However, the customer ID number may be the primary key for the customer entity, and thus, the customer ID number is not omitted from the second level cache 114.

The illustrated statistical data of FIG. 4 may be based only on relatively recent data, which may allow for trends in attribute usage to adaptively optimize which attributes will be omitted from the second level cache 114. For example, attributes which were previously stored in the second level cache 114, may see a decrease in accesses over time, and fall below the currently configured threshold (e.g., 2%). These attributes may be omitted from second level cache 114 as time goes on, based on the decrease in accesses (e.g., when the total access percentage falls below 2%). Thus, the attributes which are omitted may be adaptively optimized based on the attributes being accessed by the enterprise application execution module 116 at any given time. Also, the threshold values may dynamically change based on the statistical data and/or based on user inputs to the enterprise system 100.

The specific benefits of the presently disclosed adaptive optimization of the second level cache depend on the specific hardware and software of an enterprise system 100, including capacity of first level cache and second level cache, access speeds of first level cache 110, second level cache 114, and database 102 via network 104, processing speed of the enterprise application execution module 116, access patterns of the executable modules 116a, 116b, the distribution of entities accessed, the distributions of attributes accessed, and the like. For example, the size of the second level cache 114 relative to the size of the first level cache 110 may impact a threshold value that is used for determining whether to omit an attribute from the second level cache 114. For example, if the second level cache 114 is relatively small, then the threshold value may be higher, whereas if the second level cache 114 is relatively large, then the threshold value may be lower.

Figure 5:
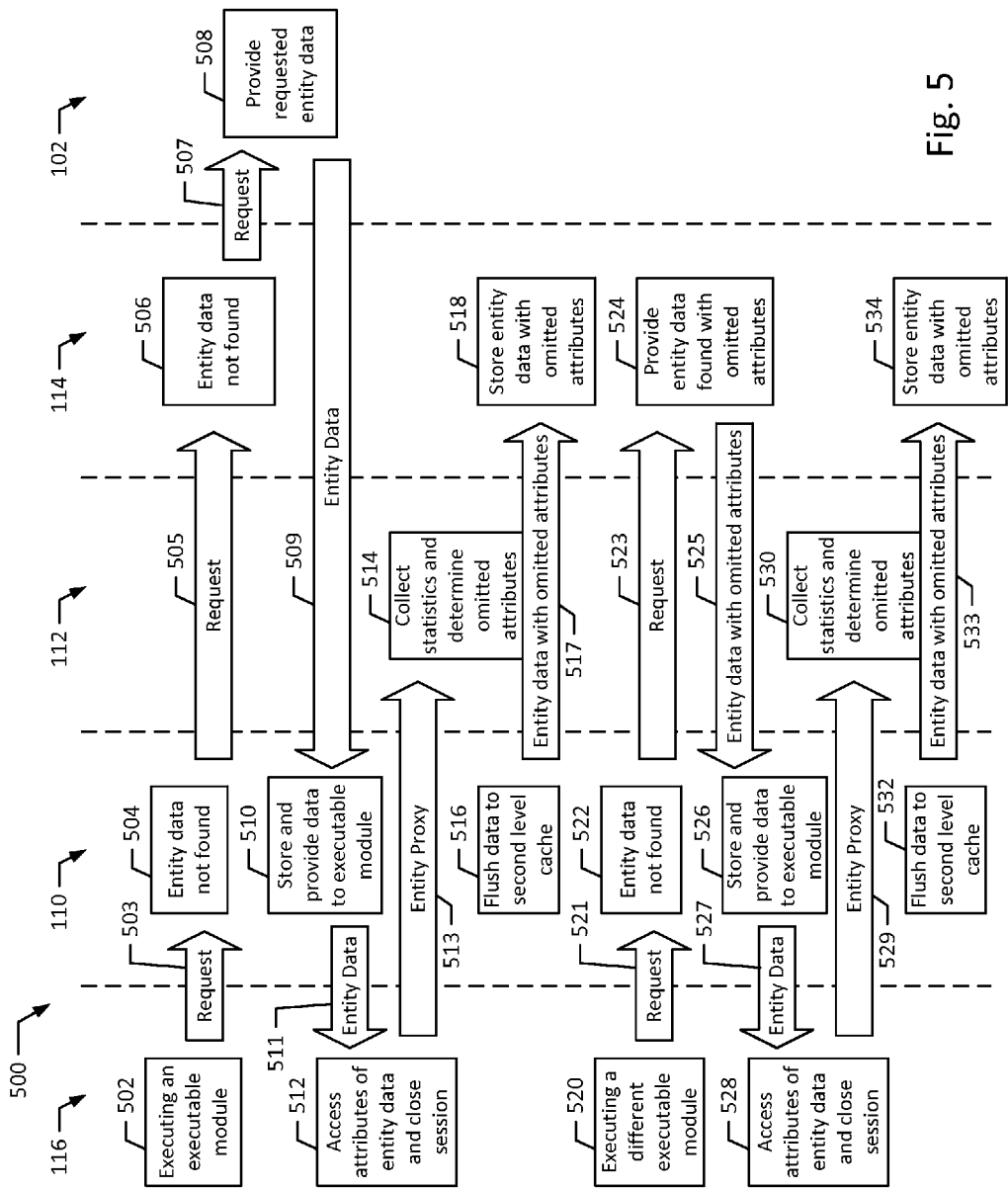
FIG. 5 is a flow diagram illustrating an example process for adaptive optimization of second level cache, according to an example embodiment of the present disclosure.

FIG. 5 is a flow diagram illustrating an example process for adaptive optimization of second level cache, according to an example embodiment of the present disclosure. Although the process 500 is described with reference to the flow diagram illustrated in FIG. 5, it will be appreciated that many other methods of performing the acts associated with the process 500 may be used. For example, the order of some of the blocks may be changed, certain blocks may be combined with other blocks, and some of the blocks described are optional or may be performed by different devices.

In the example process 500, data may flow between the database 102, the first level cache 110, the second level cache 114, the application execution module 116, and the cache optimizer 112, for example, via the network 104 and/or the interface circuit 108. The example process 500 may begin with executing an executable module 116a (block 502). The executable module 116a sends a request to the first level cache 110 to access entity data (e.g., in a row of customer data) (block 503). The first level cache 110 checks a block 110a for the requested entity data, but the entity data is not found (block 504). A request is sent to the second level cache 114 to access the entity data (block 505). The second level cache 114 checks for the requested entity data, but the entity data is not found (block 506). A request is sent to the database 102 via the network 104 to access the entity (block 507). The database 102 provides the requested entity data for the executable module 116a (block 508). The entity data (e.g., a row of customer data) is sent via the network 104 to the first level cache 110 (block 509). The first level cache 110 stores and provides the entity data to the executable module 116a (block 510). The requested entity data (e.g., specific attributes of the customer data) is sent to the executable module 116a (block 511). Accessing the entity data from the database 102 has a much higher latency than accessing cached data.

The executable module 116a accesses attributes of the entity data and closes the session once the execution is complete (block 512). An entity proxy 120a provides attribute access data to the cache optimizer 112 (block 513). The cache optimizer collects statistics and determines omitted attributes (e.g., using a threshold value) (block 514). After the session is closed, the first level cache 110 flushes the entity data to second level cache 114 (block 516). Based on the cache optimizer 112 indication of which attributes to omit, the entity data with omitted attributes is sent to the second level cache 114 (block 517). The second level cache 114 stores the entity data with omitted attributes (block 518). The entity data with omitted attributes may be accessed across sessions, and thus, may be shared by any executing executable module 116b, for as long as the entity data with the omitted attributes is stored in the second level cache 114. Because attributes are omitted from the entity data, the remaining attributes may reside in second level cache 114 for a longer period of time.

A different executable module 116b that needs to access the same entity data is executing (block 520). The executable module 116b sends a request to the first level cache 110 to access entity data (e.g., in a row of customer data) (block 521). The first level cache 110 checks a block 110b for the requested entity data, but the entity data is not found (block 522). A request is sent to the second level cache 114 to access the entity data (block 523). The second level cache 114 checks for the requested entity data, and the entity data found with omitted attributes (block 524). The entity data with the omitted attributes is sent to first level cache 110 (block 525). The first level cache 110 stores and provides the entity data to the executable module 116b (block 526). The requested entity data (e.g., specific attributes of the customer data that were not omitted) is sent to the executable module 116b (block 527). For example, a majority of the time, the specific attributes that need to be accessed will not be omitted from the entity data stored in the second level cache 114.

The executable module 116b accesses attributes of the entity data and closes the session once the execution is complete (block 528). An entity proxy 120b provides attribute access data to the cache optimizer 112 (block 529). The cache optimizer collects statistics and determines omitted attributes (e.g., using a threshold value) (block 530). After the session is closed, the first level cache 110 flushes the entity data to second level cache 114 (block 532). Based on the cache optimizer 112 indication of which attributes to omit, the entity data with omitted attributes is sent to the second level cache 114 (block 533). For example, if the cache optimizer determines that a new attribute should be omitted, based on recent attribute usage, an additional attribute may be omitted from the entity data. The second level cache 114 stores the entity data with omitted attributes (block 534). The example process 500 may occur concurrently in parallel fashion (e.g., many executable modules 116a, 116b operating concurrently) and/or iteratively, consecutively, and/or sequentially (e.g., as each executable module 116a, 116b completes execution, a new executable module 116a, 116b begins executing again).

Adaptive optimization of second level cache 114 as proposed herein takes a new and different technological approach which was not possible using previously existing methods and systems. Accordingly, the enterprise server 106 and the enterprise system 100 are improved by using the presently disclosed cache optimizer 112 in conjunction with the second level cache 114, which shares entity data with omitted attributes between different executable modules 116a, 116b, as described herein.

It will be appreciated that all of the disclosed methods and procedures described herein can be implemented using one or more computer programs, modules, or components. These modules or components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a database server including a database; and
an enterprise application server including:
an enterprise application execution module;
a first level cache;
a second level cache; and
a cache optimizer configured to determine which data stored in the first level cache to omit from the second level cache,
wherein the enterprise application server is configured to:
iteratively execute an executable module, which causes:
receiving entity data from the database, the entity data including a plurality of different attributes;
storing the entity data in the first level cache; and
accessing at least one attribute in the entity data from the first level cache;
collect statistical data based on the executing executable module, the statistical data representing a quantity of accesses of each of the plurality of attributes;
determine at least one attribute, of the plurality of attributes, to omit from the second level cache based on the statistical data;
transfer a subset of the entity data from the first level cache to the second level cache with the subset having the at least one attribute omitted from the entity data; and
store, in the second level cache, the subset of the entity data with the at least one attribute omitted.

2. The system of claim 1, wherein determining the at least one attribute to omit from the second level cache is based on the at least one attribute having a quantity of accesses below a threshold level.

3. The system of claim 2, wherein the quantity of accesses is represented as a percentage based on a first quantity of accesses of an attribute to a second quantity of total accesses of all entity data.

4. The system of claim 3, wherein the threshold level is a configurable value.

5. The system of claim 4, wherein the threshold level has a default value of 5%.

6. The system of claim 1, wherein collecting the statistical data includes an entity proxy providing the quantity of accesses of each of the plurality of attributes for each respective iterative execution of the executable module.

7. The system of claim 1, wherein a respective session object is exclusively accessible by each respective iterative execution of the executable module, and each respective session object is dynamically allocated a block of the first level cache which is inaccessible to each other iterative execution of the executable module.

8. The system of claim 7, wherein all entity data with the at least one attribute omitted stored in the second level cache is shared across session objects.

9. The system of claim 1, wherein the executable module is one of a plurality of executable modules which iteratively execute, and the plurality of executable modules execute concurrently.

10. The system of claim 9, wherein the statistical data is based on the plurality of executable modules.

11. A method comprising:
iteratively executing an executable module, which causes:
receiving entity data from a database, the entity data including a plurality of different attributes;
storing the entity data in a first level cache; and
accessing at least one attribute in the entity data from the first level cache;
collecting statistical data based on the executing executable module, the statistical data representing a quantity of accesses of each of the plurality of attributes;
determining, by a cache optimizer, which data stored in the first level cache to omit from a second level cache by determining at least one attribute, of the plurality of attributes, to omit from the second level cache based on the statistical data;
transferring a subset of the entity data from the first level cache to the second level cache with the subset having the at least one attribute omitted from the entity data; and
storing, in the second level cache, the subset of the entity data with the at least one attribute omitted.

12. The method of claim 11, further comprising:
transferring a second subset of second entity data from the first level cache to the second level cache with the second subset having the at least one attribute omitted from the second entity data; and
storing, in the second level cache, the second subset of the second entity data with the at least one attribute omitted.

13. The method of claim 11, wherein determining the at least one attribute to omit from the second level cache is based on the at least one attribute having a quantity of accesses below a threshold level.

14. The method of claim 13, wherein the quantity of accesses is represented as a percentage based on a first quantity of accesses of an attribute to a second quantity of total accesses of all entity data.

15. The method of claim 11, wherein collecting the statistical data includes an entity proxy providing the quantity of accesses of each of the plurality of attributes for each respective iterative execution of the executable module.

16. The method of claim 11, wherein a respective session object is exclusively accessible by each respective iterative execution of the executable module, and each respective session object is dynamically allocated a block of the first level cache which is inaccessible to each other iterative execution of the executable module.

17. The method of claim 16, wherein all entity data with the at least one attribute omitted stored in the second level cache is shared across session objects.

18. The method of claim 11, wherein the executable module is one of a plurality of executable modules which iteratively execute, and the plurality of executable modules execute concurrently.

19. The method of claim 18, wherein the statistical data is based on the plurality of executable modules.

20. A non-transitory computer readable medium storing instructions which, when executed, cause an enterprise application server including a cache optimizer to:
iteratively execute an executable module, which causes:
receiving entity data from a database, the entity data including a plurality of different attributes;
storing the entity data in a first level cache; and
accessing at least one attribute in the entity data from the first level cache;
collect statistical data based on the executing executable module, the statistical data representing a quantity of accesses of each of the plurality of attributes;
determine, by the cache optimizer, which data stored in the first level cache to omit from a second level cache by determining at least one attribute, of the plurality of attributes, to omit from the second level cache based on the statistical data;
transfer a subset of the entity data from the first level cache to the second level cache with the subset having the at least one attribute omitted from the entity data; and
store, in the second level cache, the subset of the entity data with the at least one attribute omitted.

* * * * *